NOISE CANCELLATION IN LINEAR SELECTION MEMORIES

Filed Nov. 7, 1960 3 Sheets-Sheet 1

INVENTORS,
MICHAEL M. STERN
HERBERT A. ULLMAN
BY F. I. Sullivan
ATTORNEY

Nov. 3, 1964 M. M. STERN ETAL 3,155,946

NOISE CANCELLATION IN LINEAR SELECTION MEMORIES

Filed Nov. 7, 1960 3 Sheets-Sheet 2

INVENTORS,
MICHAEL M. STERN
HERBERT A. ULLMAN
BY F. L. Sullivan
ATTORNEY

Nov. 3, 1964 M. M. STERN ETAL 3,155,946

NOISE CANCELLATION IN LINEAR SELECTION MEMORIES

Filed Nov. 7, 1960 3 Sheets-Sheet 3

INVENTORS
MICHAEL M. STERN
BY HERBERT A. ULLMAN
F. L. Sullivan
ATTORNEY

United States Patent Office 3,155,946
Patented Nov. 3, 1964

3,155,946

NOISE CANCELLATION IN LINEAR SELECTION MEMORIES

Michael M. Stern, Brookline, and Herbert A. Ullman, Burlington, Mass., assignors to Sylvania Electric Products Inc., a corporation of Delaware Filed Nov. 7, 1960, Ser. No. 67,544
4 Claims. (Cl. 340—174)

This invention is concerned with electronic data processing equipment and particularly with noise cancellation in linear selection magnetic core memories.

In magnetic core memory systems of the linear selection type where drive windings run parallel to sense windings for a length equivalent to the number of words in the memory, noise spikes of considerable magnitude are inductively coupled into the sense windings as a result of current pulses along the drive windings. These spikes are equal to $$L\frac{di}{dt} \text{ and } C\frac{de}{dt}$$

and occur during the rise time and the fall time of the digit pulse. Consequently, they are present whenever a "1" is written into the memory. In a typical example, positive spikes of 1.6 volts and negative spikes of one volt have been experienced in a 256 word linear selection memory.

In high speed memories, e.g. two microsecond read-write cycle or faster, these spikes sometimes saturate the sense amplifier with the result that, when the signal which should be detected appears, the amplifier has not come out of saturation and therefore cannot recognize its proper signal input. Also, the sense winding itself is useless as a conductor of its proper signals during the time period that it must wait for noise spikes to decay.

A primary object of the present invention is to provide an improved memory system for electronic data processing equipments, and particularly one in which undesired noise spikes are effectively canceled.

These and related objects are accomplished in one illustrative embodiment of the invention which will be described as featuring two noise canceling techniques. The first involves interconnecting the digit drive lines to the component memory planes of the system in such a manner that equal and opposite voltage spikes (with a net cancellation effect) are developed in the sense winding as a result of digit current pulses. The second technique inserts a loop of intertwined and cross-connected digit and sense windings between planes in such a manner that noises inductively picked up by the sense windings within the planes are canceled out in the external loop. To improve the effectiveness of this cancellation, the intertwined windings may be tuned by arranging the twisted windings into the shape of an elliptical loop and varying the configuration of the ellipse to achieve a desired capacitive or inductive effect.

Other objects, features and modifications of the invention will be apparent from the following more detailed description of the illustrative embodiments shown in the accompanying drawings, wherein.

Figure 1:
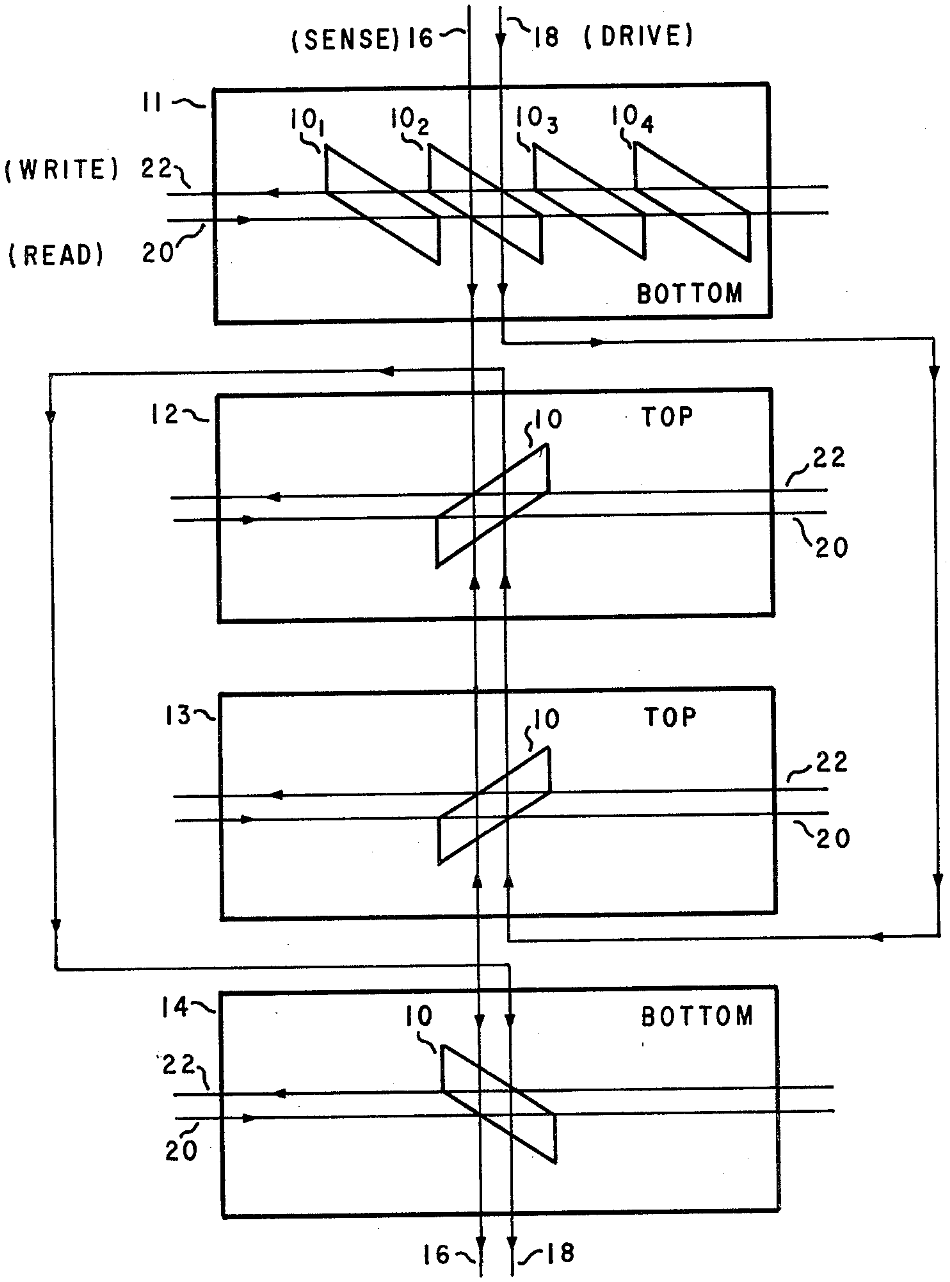
FIG. 1 is a schematic representation of a plurality of memory planes wired in accordance with the invention.

The diagram of FIG. 1 shows a plurality of magnetic cores 10, representing corresponding digits or bits in a series of planes 11, 12, 13, and 14, linked by sense windings 16, drive windings 18, read windings 20 and write windings 22.

The basic arrangement of the component cores in a linear selection memory is explained in copending U.S. patent application S.N. 65,993, filed October 31, 1960, also assigned to Sylvania Electric Products Inc. This patent application and the publications referred to therein may be consulated for a detailed description of the physical arrangement and electrical operation of linear selection memories. The following brief description, however, is adequate background for explaining the operation of the present invention.

In the diagram of FIG. 1, four memory planes 11–14 are shown. Each plane includes a plurality of magnetic cores 10 arranged in a matrix of rows and columns. One row of cores $10_1$–$10_4$ is shown in the first plane 11. This row represents a four digit (or bit) word and every other row of cores in each one of the planes represents another word in the memory. As shown in FIG. 1 every core 10 is linked by four conductors, a sense winding 16, a drive winding 18, a read winding 20 and a write winding 22. A common read and write winding links all of the component cores of each separate word in the memory and a common sense winding 16 and drive winding 18 link the corresponding digit core of each word. This is demonstrated in FIG. 1 for the second digit (core $10_2$) for every word in the memory.

The normal memory cycle is delivery of a full read pulse to the particular read conductor 20 linking the component cores of the desired word to be read from memory. This causes a reversal of flux within the cores in which "1" is stored and induces an output signal in the sense winding 16 linking the particular cores concerned. This read pulse is followed by a write pulse of half-flux reversal magnitude applied to the conductor 22 linking the address from which data has been read. Coincident with this pulse, a second pulse of half-flux reversal magnitude is applied to the digit drive conductor 18 linking the cores into which a "1" is to be written by flux reversal of the core. It is the inductive effect of this digit drive pulse on the sense winding 16 that the present invention overcomes.

The manner in which sense winding 16 and drive winding 18 are arranged in this embodiment of the invention is shown in FIG. 1. Sense winding 16 links the second digit core ($10_2$) of each plane in a continuous unidirectional path. The digit drive winding 18, however, links the cores of plane 11 in the same direction that these cores are linked by conductor 16. It links the cores of planes 12 and 13, however, in the opposite direction and then returns to link the cores of plane 14 in the same direction, as it did the cores of plane 11. The polarity of the signal induced between the windings is shown by the arrows. An examination of them reveals that signals of one polarity are induced in planes 11 and 14, and signals of opposite polarity in planes 12 and 13. The total effect is a net cancellation of all induced signals in the sense winding 16.

It will be appreciated that there must be an even number of addresses in the memory, and the drive winding 18 must link exactly one-half the cores in one direction and the other half of the cores in the opposite direction, to achieve optimum cancellation.

Figure 2:
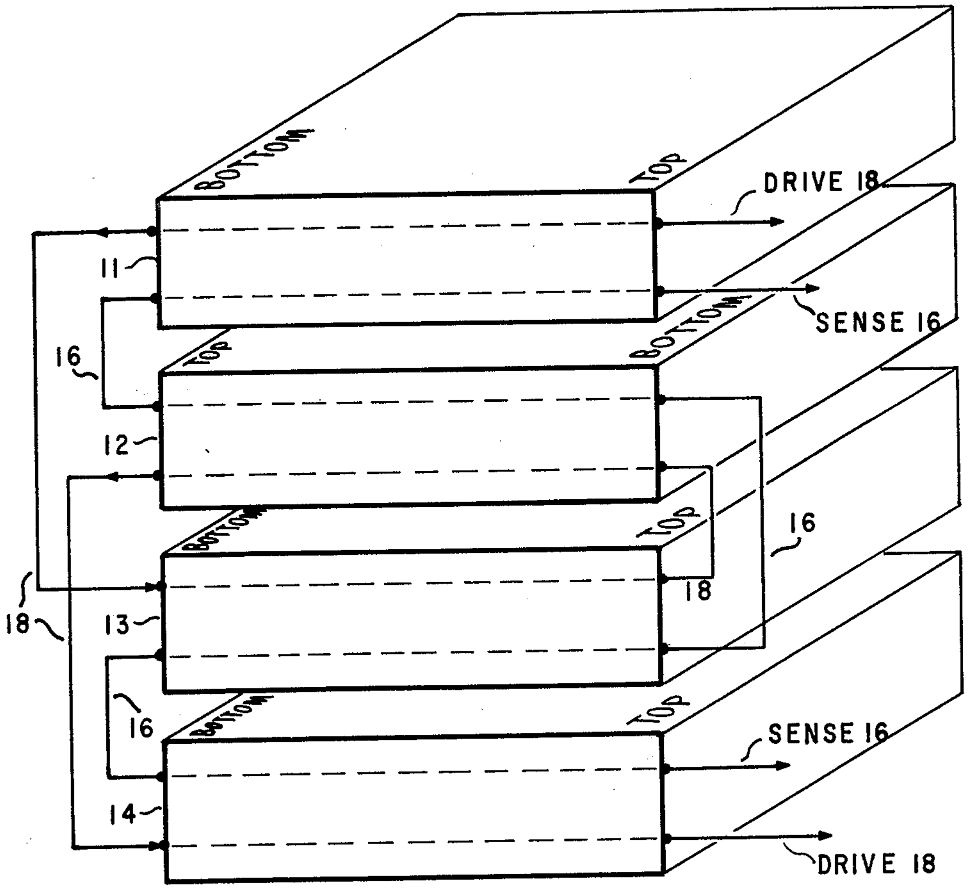
FIG. 2 is a pictorial representation of a "stack" of planes wired in the manner of FIG. 1.

Upon first analysis, it appears that this arrangement requires extensive interwiring between planes. When, however, the component planes of the memory are folded back upon each other, as shown in FIG. 2, interplane wiring need never be longer than the order of approximately one inch.

Due to this wiring system, the core output signal is induced in one direction in half of the sense winding and in the opposite direction in the other half of the sense winding. Consequently, both positive and negative core outputs appear and a bipolar sense amplifier is required in the memory output. Such an amplifier is disclosed and described in copending U.S. patent application S.N. 67,571, filed November 7, 1960, now Patent No. 3,122,650, also assigned to Sylvania Electric Products Inc.

Figure 3:
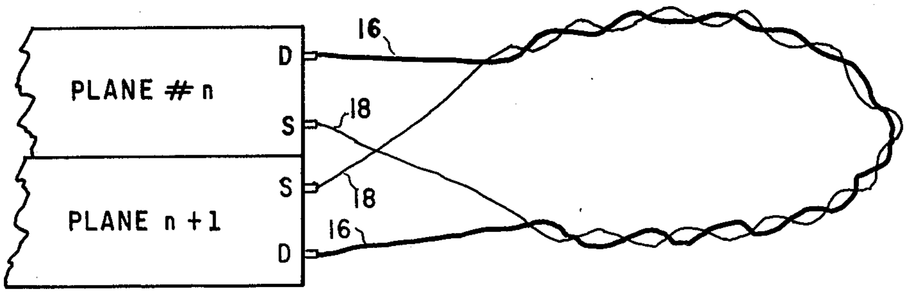
FIG. 3 is a diagrammatic representation of sense and drive windings inter-twisted to cancel spurious system noises.

The second noise cancellation technique of the invention, as explained previously, involves the use of additional wiring between planes so that the signals induced into the sense winding by the drive winding, as they link in common the cores of one plane, is offset (i.e. canceled) by inducing the same signals in a bucking relationship into the sense winding in the connection between planes of the sense and drive windings. Thus, after the sense and digit windings have experienced their inductive relationship as they link the cores of one plane, inductive signals equal and opposite to those generated within the plane are induced onto the sense winding before the two windings enter the next plane. This interconnection between planes is shown in FIGS. 3–5.

As shown in these figures, the interconnection between each plane ($n$) and its next adjacent plane ($n+1$) is accomplished by a pair of conductors. At one end this pair has one conductor connected to the drive winding of plane $n$ and the other conductor connected to the sense winding of plane $n+1$. At the other end of the pair the first conductor is connected to the drive winding of plane $n+1$ and the second conductor is connected to the sense winding of plane $n$.

The length of these connecting windings can be made shorter than the length of the conductors linking the cores within the individual planes by maximizing the coefficient of capacitive and inductive couplings. This is accomplished by twisting the two conductors of the connecting pair about each other to form a loop. This shortening of the length of the windings is desirable because the self-inductance of both windings should be kept as low as possible.

Figure 4:
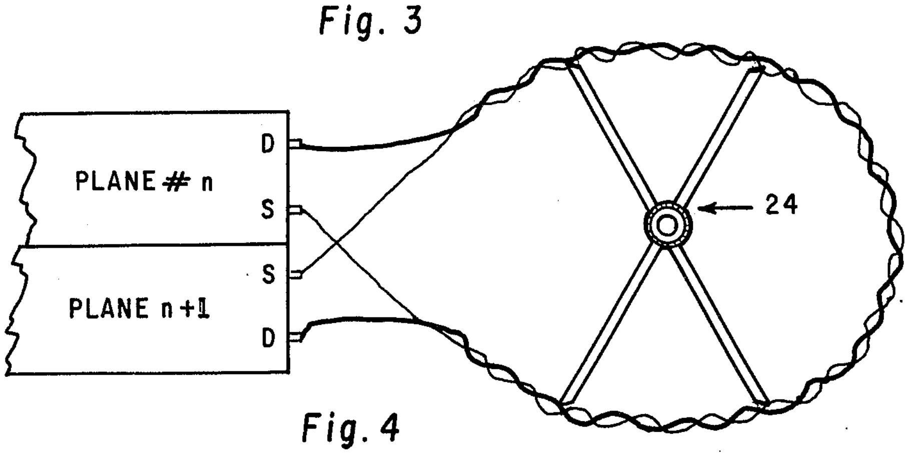
FIG. 4 is a diagrammatic representation of the windings of FIG. 3 arranged for relatively large mutual inductance and increased cancellation; and, FIG. 5 is a similar diagram of these windings arranged for relatively small mutual inductance and decreased cancellation.
Figure 5:
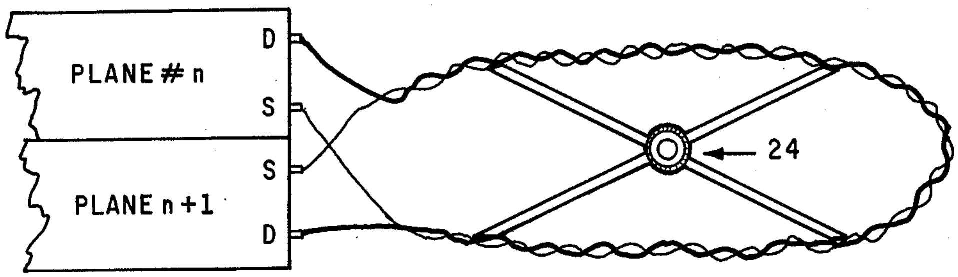

The accuracy of signal cancellation can be improved by employing the fine tuning adjustment technique shown in FIGS. 4 and 5. Here, the twisted pair is arranged in a circular or elliptical loop supported by a variable spacer 24. By varying the diameter of the circle or the minor axis of the ellipse the mutual inductance of the twisted wire can be changed by adjusting the proximity of the wires carrying opposite currents.

A combination of both of these noise canceling techniques may be employed within a single memory system. In such a structure the technique demonstrated by FIGS. 1 and 2 may be employed to cancel noise signals down to a few millivolts and the second system of FIGS. 3–5 may be used to cancel the remainder of the noise and to adjust differences between digit sense winding pairs. If the second technique is employed by itself, a unipolar sense amplifier is adequate in the memory output, since the internal wiring of the core plane need not be changed.

It will be appreciated that, although this description has been limited to a discussion of a single paired combination of a digit and a sense winding, there will be an additional pair of these windings for each digit of the memory word length.

The invention has been described with reference to particular illustrative embodiments. It is not limited, however, to the specific details of the preceding description but embraces the full scope of the following claims.

What is claimed is:

1. A magnetic core memory system comprising: a plurality of memory planes, each plane including a plurality of magnetic cores having substantially rectangular hysterisis loop characteristics; a plurality of sense windings; a plurality of digit drive windings; said windings being arranged in paired combinations of one sense winding and one drive winding, with the component windings of each pair linking a common group of cores and lying in inductive coupling relationship with one another; and, means for connecting the sense and drive windings between planes, said means including a twisted pair of conductors, one end of said pair having its first conductor connected to the sense winding of one plane and its second conductor connected to the drive winding of the other plane, and the other end of said pair having said first conductor connected to the sense winding of said other plane and said second conductor connected to the drive winding of said one plane, wherein said twisted pair is arranged in a looped configuration.

2. The invention according to claim 1 wherein said looped configuration is inductively and capacitively tunable by varying the shape of said looped configuration.

3. The invention according to claim 1 wherein each of said looped configurations, in its perimeter, is equal in effective length to the sum of the effective lengths of said paired combination of windings within the corresponding ones of said planes.

4. The invention according to claim 3 wherein said looped configuration is inductively and capacitively tunable by varying its shape.

References Cited in the file of this patent

UNITED STATES PATENTS

| | | |
|---|---|---|
| 2,739,300 | Haynes | Mar. 20, 1956 |
| 2,889,540 | Bauer et al. | June 2, 1959 |
| 2,897,482 | Rosenberg | July 28, 1959 |
| 2,900,623 | Rosenberg | Aug. 18, 1959 |
| 2,900,624 | Stuart-Williams et al. | Aug. 18, 1959 |

OTHER REFERENCES

Publication I: IBM Technical Disclosure Bulletin, vol. 2, No. 2, August 1959, pp. 37, 38, #117.

Publication II: Proceedings of the IRE, March 1957, pp. 325–334, #64D.